US006683622B2

(12) United States Patent
Arsenault

(10) Patent No.: US 6,683,622 B2
(45) Date of Patent: *Jan. 27, 2004

(54) METHOD FOR DEFINING THE SCALE OF REUSABLE GEOMETRIC CONTENT

(75) Inventor: David Wayne Arsenault, Ithaca, NY (US)

(73) Assignee: Autodesk, Inc., San Rafael, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/481,138

(22) Filed: Jan. 11, 2000

(65) Prior Publication Data

US 2003/0085911 A1 May 8, 2003

(51) Int. Cl.[7] ............................................. G06T 11/00
(52) U.S. Cl. ...................................................... 345/666
(58) Field of Search ................................ 345/619, 655, 345/666, 681, 660

(56) References Cited

U.S. PATENT DOCUMENTS

| 5,371,845 A | | 12/1994 | Newell et al. |
| 5,490,241 A | | 2/1996 | Mallgren et al. |
| 5,572,639 A | | 11/1996 | Gantt |
| 5,822,587 A | * | 10/1998 | McDonald et al. .......... 717/108 |
| 5,978,582 A | * | 11/1999 | McDonald et al. .......... 345/619 |
| 6,016,147 A | | 1/2000 | Gantt |
| 6,052,130 A | * | 4/2000 | Bardon et al. ............... 345/666 |
| 6,178,432 B1 | * | 1/2001 | Cook et al. .................. 345/766 |

OTHER PUBLICATIONS

Axel Mahler et al., An Integrated Toolset for Engineering Software Configurations, 1988, ACM, pp. 191–200.*

* cited by examiner

*Primary Examiner*—Jeffrey Brier
(74) *Attorney, Agent, or Firm*—Gates & Cooper LLP

(57) ABSTRACT

A method, apparatus, and article of manufacture for enabling the creation of software content objects for displaying information on a monitor attached to a computer is disclosed. The method comprises the steps of creating a unit system of the shape object, creating a scale method property of the shape object, authoring the shape object in the unit system and producing a graphical output therefrom, and selectively modifying the graphical output of the shape object based on the unit system and the scale method property to display desired information on the monitor.

15 Claims, 4 Drawing Sheets

METHOD FOR DEFINING THE SCALE OF REUSABLE GEOMETRIC CONTENT

CROSS REFERENCE TO RELATED APPLICATIONS

This application is related to the following co-pending and commonly assigned patent applications:

U.S. patent application Ser. No. 09/092,383, entitled "SHAPE OBJECTS HAVING AUTHORABLE BEHAVIORS AND APPEARANCES," by Lawrence D. Felser, et al., filed on Jun. 5, 1998, now U.S. Pat. No. 6,064,386, issued on May 16, 2000; and U.S. patent application Ser. No. 09/169,599, entitled "FRAMEWORK FOR OBJECTS HAVING AUTHORABLE BEHAVIORS AND APPEARANCES," by Lawrence D. Felser, et al., filed on Oct. 9, 1998, now U.S. Pat. No. 6,025,849, issued on Feb. 15, 2000;

both of which applications are incorporated by reference herein.

BACKGROUND OF THE INVENTION

1. Field of the Invention

The present invention relates generally to software objects, and in particular, to a method, apparatus, and article of manufacture for defining the scale of reusable geometric content for computer programs.

2. Description of the Related Art

The use of Computer Assisted Drafting (CAD) application programs is well known in the art. Some CAD programs provide templates and palettes that help users create documents, graphical presentations, etc. However, these templates and palettes provide only limited assistance and does little to help the user connect standard CAD components, define new components, or define methods of manipulating the components within the CAD program.

Most standard components are predefined by the CAD program itself, or are created by third-party programmers, e.g., clip art, etc., leaving little room for the user to define custom shapes without using the predefined standard components as building blocks.

Using clip art as an example, clip art is typically a graphical representation of an object, person, etc., that can be sized and reused in various circumstances to create a presentation or other graphical display. Clip art is typically used in combination with other graphic objects, including additional clip art, to satisfy some task, e.g., the creation of a report, flyer, schematic drawing, presentation, etc.

Clip art, however, is typically defined in a unitless manner and scaled to fit a frame defined by the user, or the frame is sized to fit the clip art geometry.

A broader definition of a component is typically referred to as "shape object." Although a shape object includes graphics such as clip art, shape objects can also be graphics that are drawn-to-scale for use in mechanical or architectural drawings. Shape objects can also have properties that identify a real-world object. There can be intelligence in the shape objects, so that the shape object knows how to respond to user actions, including changing form. However, a reusable shape object cannot be scaled as easily as clip art can, since a reusable shape object has internal units and scale factors that may not match up with the user's present drawing. For example, clip art is done based upon the size it should appear on the printed page. The clip art author is primarily concerned with making the graphic look good when viewed in a report or presentation. The user resizes the clipart to the printed page boundaries when the user's needs are slightly different from what the author anticipated.

Geometry, shape object or otherwise, that is sized to the printed page is generally not useful when constructing drawings that represent a mechanical assembly, architectural floor plan, factory setup, etc. A common approach for this is for the drawing application to either be unitless or to choose an absolute system of units.

In the unitless case, convention and process dictates the units to be used within a company or industry. For example, a company may decide to standardize on meters, meaning that all geometry must be authored in meters before it can be used. This may mean that units obtained from content provided will need to be converted before use in a drawing.

A drawing program that uses an absolute system of units dictates that all drawings, and therefore all content, must be written with a particular set of units. The chosen drawing program may provide the illusion that the user is working in his units of choice, but this is achieved by converting all numbers from the absolute system of units to the user's system of units on the fly. This approach leads to less accurate results than would be achieved in a unitless situation.

A shape object is the basic building block needed to create a reusable graphical object with intelligent behaviors. Another object, called the content object, is used to capture graphical objects for use with many drawings and transport graphical objects from one drawing to another. The content object is able to transport all graphical objects, including clipart, shapes, curves and text. The content object is never present in a drawing, but instead encapsulates all of the functionality needed to create reusable graphical objects and transport graphical objects. The common denominator of these two uses is that the content object is able to merge graphical objects into a destination drawing without knowing in advance the characteristics of the destination drawing.

Content needs to be flexible enough to adapt to many user's needs. Some users may prefer to work in inches, while others work in centimeters. Further, some users may prefer to print in one scale, while other users need the same drawing in another scale for ease of transportation or other purposes. For example, one user may work in inches to create a graphical representation of a real world object. If that user then needs to copy that graphical representation into a drawing created in centimeters, then the content object needs to know how to transport the geometry without knowing the destination. Currently, content cannot adapt to these different situations.

It can be seen, then that there is a need for shape objects that can address the problems associated with unitless and absolute unit systems. It can also be seen that there is a need for content object that can be used to capture graphical objects without knowing the characteristics of the units and scale of the destination drawing. It can also be seen that there is a need for shape objects that can be adapted to different situations based on user inputs.

SUMMARY OF THE INVENTION

To address the requirements described above, the present invention discloses a method, apparatus, and article of manufacture for enabling the creation of software content objects for displaying information on a monitor attached to a computer. The method comprises the steps of creating a unit system of the shape object, creating a scale method property of the shape object, authoring the shape object in the unit system and producing a graphical output therefrom, and selectively modifying the graphical output of the shape object based on the unit system and the scale method property to display desired information on the monitor.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
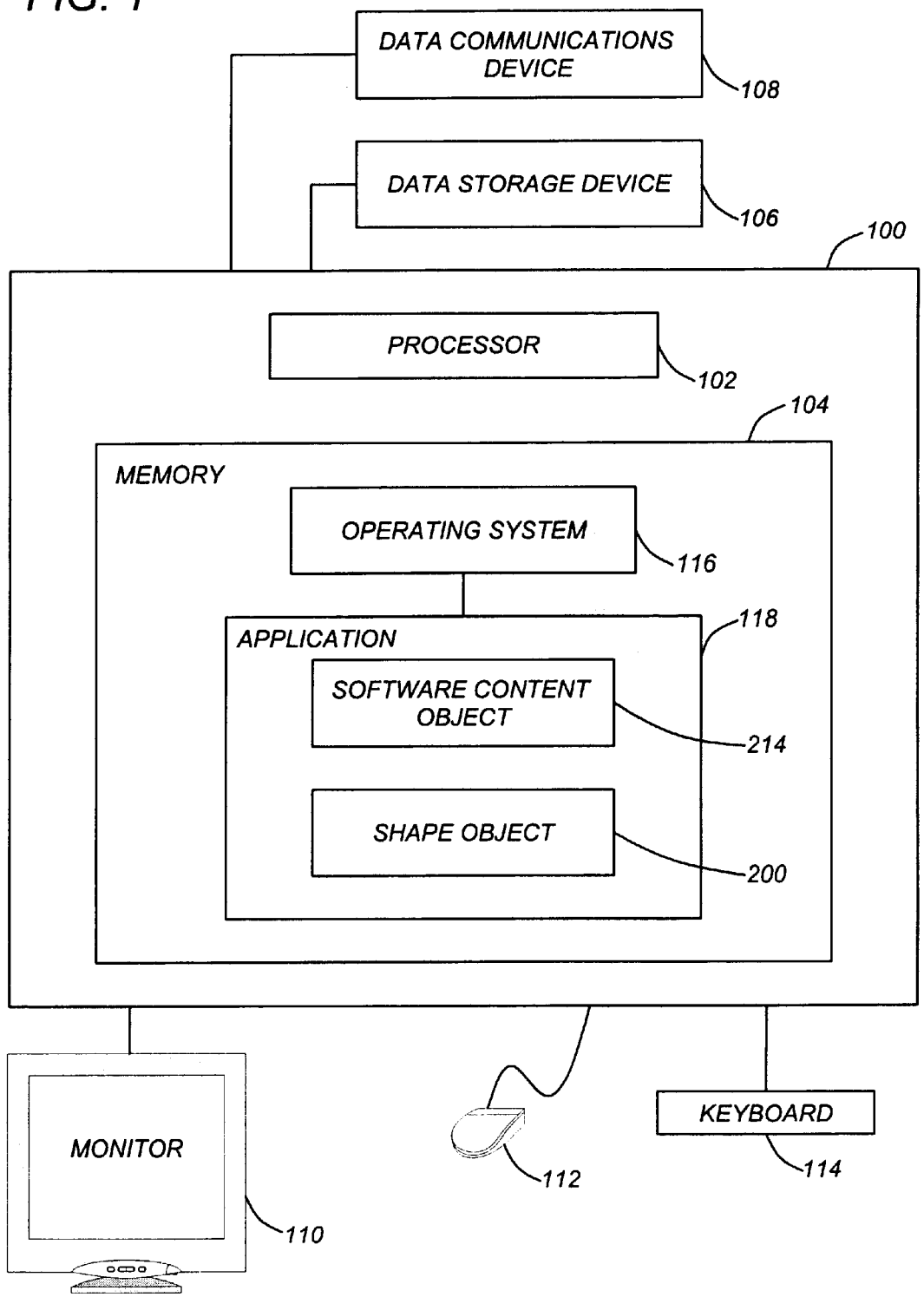
FIG. 1 is an exemplary hardware environment used to implement the preferred embodiment of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a software system that enables the creation and maintenance of relationships between properties of objects, wherein the objects are reusable graphical objects. The object comprises properties for use in scaling and displaying a graphical or textual object.

The present invention concerns shape object properties that describe the unit system of the shape object. For example, furniture that is manufactured for the United States market will normally be specified in inches, which would be the unit of choice for authoring the furniture as content. Content authored this way is more descriptive, more accurate, and easier to use.

The present invention uses properties of a software content object that captures reusable graphical objects, including shape objects, to be reused in a destination drawing. In particular, the software content object is responsible for merging the unit and scaling characteristics of the contained graphical objects with the destination drawing.

When the software content object of the present invention is added to a drawing, the unit system of merged shape objects are not converted to either a fundamental unit system, or to the unit system of the drawing. Rather, the shape object is able to query both the shape object's own units and the units of the drawing, so that the shape object draws itself at the appropriate scale.

Further, the shape object of the present invention can determine whether it should be drawn relative to the printed page size or to a scale factor.

The present invention also allows the software content object to scale unitless graphical objects (such as lines, arcs, and circles) by the relative scale between the software content object and the drawing.

The present invention includes a drawing scale property for the software content object. This drawing scale represents the intended use of the software content object. For example, the author of a reusable architectural content object would record a typical architecture drawing scale. Upon merging into a destination drawing, the software content object can verify that the destination drawing scale is similar to the intention of the content object's author. If the drawing scales are not similar, then the software content object can either refuse to merge the contained graphical elements, or decide to scale the contained graphical elements to account for the difference such that the merged graphical elements will properly display on the monitor or printed page.

Hardware Environment

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The personal computer 100 usually operates under the control of an operating system 116. The present invention is usually implemented in one or more application programs 118 that operate under the control of the operating system 116. The application program 118 is usually a CAD program or other graphics program. In the preferred embodiment, the application program 118 provides one or more shape objects 200 and one or more software content objects 214.

Generally, the application program 118, shape objects 200 and software content objects 214 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention maybe implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

The present invention is applicable to any software object that can be created by an author. However, for ease of understanding of the present invention, an example using shape objects will be provided herein to illustrate the present invention. The shape object example provided below is not intended to limit the scope of the present invention.

Shape Objects

Figure 2A:
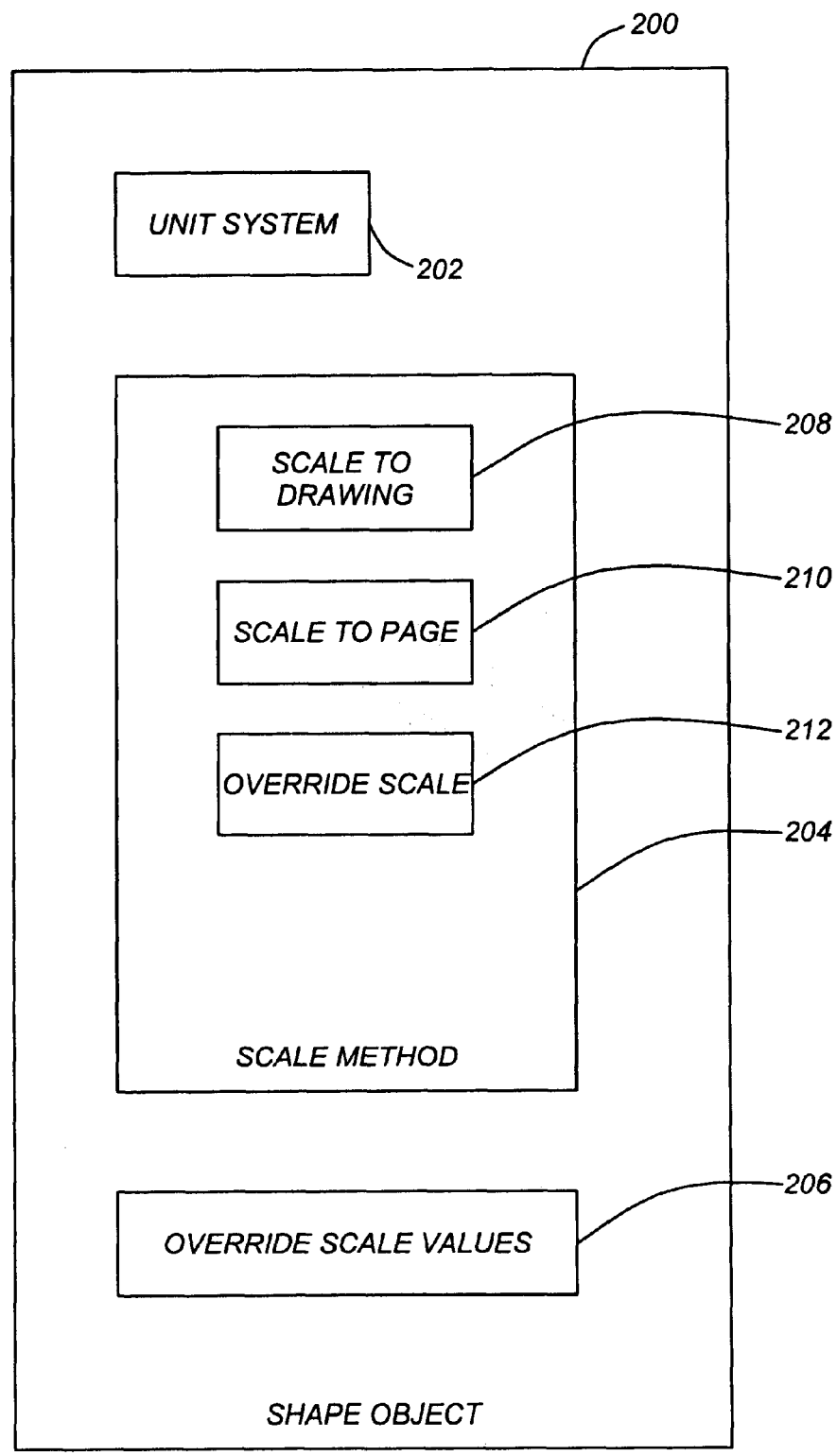
FIGS. 2A–2B illustrate block diagrams that describe the shape objects of the present invention.

FIG. 2A illustrates a block diagram that describes the shape objects of the present invention. Shape objects 200 comprise several properties, including a unit system 202, a scale method 204, override scale values 206, and interpreter 224.

Unit system 202 defines the system of units that are used for the shape, e.g., inches, centimeters, gallons, etc. The scale method 204 comprises several sub-methods, including scale to drawing 208, scale to page 210, and override scale 212. Scale to drawing 208 provides a method for scaling the shape object 200 to the scale of the drawing that shape object 200 is merged into. Scale to page 210 provides a method for scaling the shape object 200 to the page that shape object will be printed on. Override scale 212 provides a method for overriding the scale of the shape object 200. Optional override scale values 206 can be applied to the width of shape objects 200, the height of shape objects 200, or both. Optional override scale values 206 are used for situations where the shape object 200 is being used outside of its intended use, e.g., adding a truck shape object 200 to a flow chart.

Software Content Objects

Figure 2B:
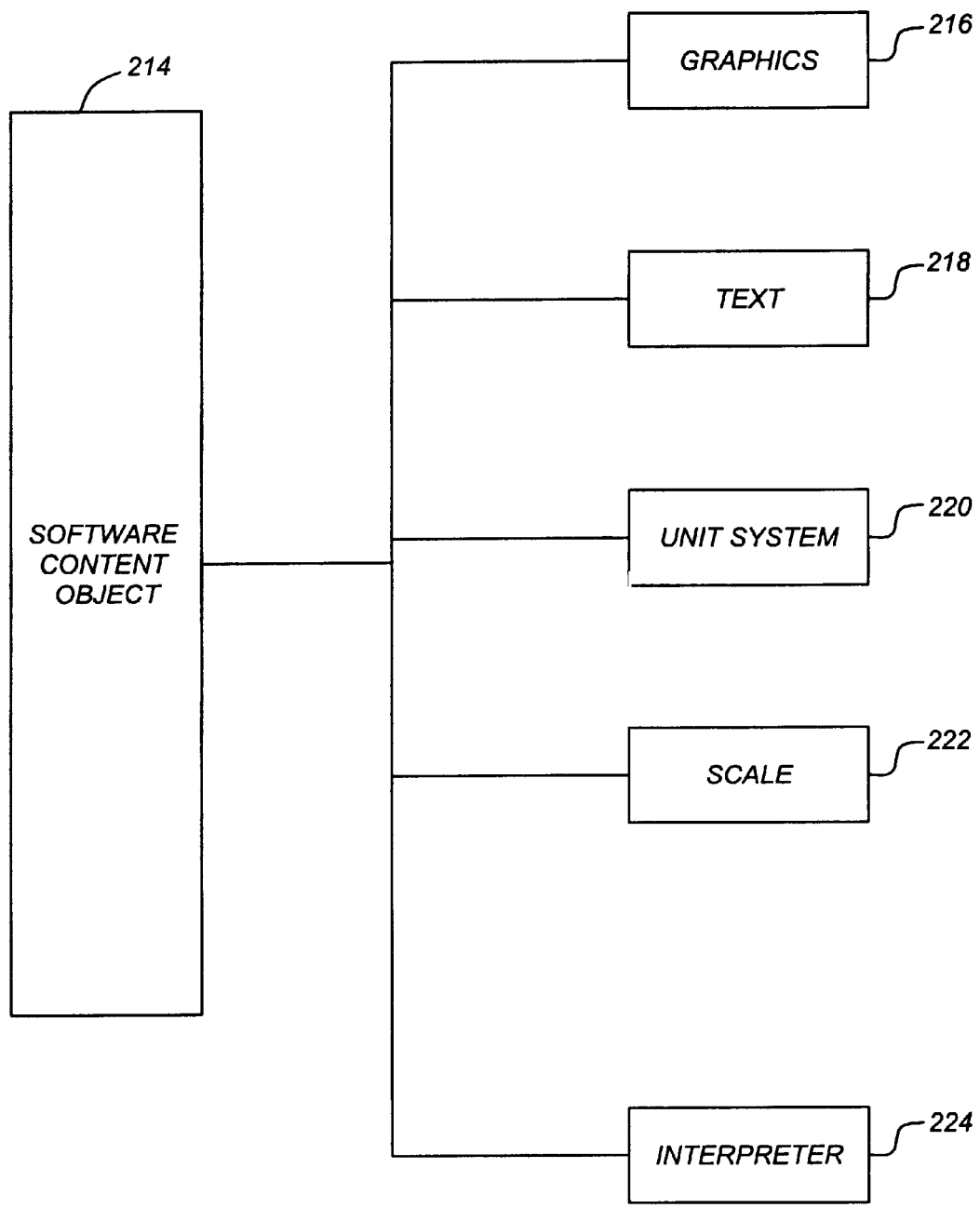

FIG. 2B is a block diagram that illustrates the components of a software content object 214, according to the present invention. The software content object 214 is comprised of a number of different elements: (1) a graphics section 216 that provides the graphical input, consisting of primitive geometry and shapes 200, for the software content object 214; (2) a text section 218 that includes zero or more textual objects of geometry, (3) a unit system 220 that defines the unit system of the software content object 214; (4) a drawing scale property 222 that provides the drawing scale factor for the software content object 214; and (5) an interpreter 224 that interprets the graphics 216, text 218, unit system 220, and drawing scale 222, to properly merge the graphics 216 and text 218 into the drawing for display on the monitor 110.

The software content object 214 is authored (also called created) with the values of the properties of the objects comprising the software content object 214. This aspect of adding new objects or replacing existing objects within a software content object 214 is part of the authoring process. Authoring is an activity that is external to the software content object 214; the software content object 214 source code, along with the source code for the objects within the software content object 214, are not affected by the authoring process. This bifurcation of the authoring activity from the software content object 214 allows the software content object to be authored statically or at runtime. The software content object 214 is then persistent until modified.

The graphics 216 and text 218 of software content object 214 are the graphical and textual portions of the object 214, and, as such, are defined by the user as desired to illustrate whatever physical device or idea is required by the user.

A second method of creating a content object 214 is to interactively select graphical and textual elements of a drawing and perform a gesture to transport or copy those elements to another drawing. This operation creates the content object 214 by copying the graphical elements to the content object graphics 216 and the textual elements to the content object text 218. The unit system 220 and the drawing scale 222 are copied directly from the drawing definition itself.

Unit System of the Shape Object

As described above, the unit system 202 is a unit system that remains with the shape object 200 regardless of where the shape object 200 is used. For example, a shape object 200 that illustrates a table can be authored in inches, whereas the floor plan where the table is to be used can be authored in meters. Instead, the shape object interpreter 224 knows to keep the table object 200 in inches while the floor plan drawing remains in meters. The user can then position the table using the units of the floor plan, e.g., 0.5 meters from a particular wall. While table object 200 is part of the floor plan drawing, the size of the table object 200 can be increased from 36 to 48 inches.

Prior systems would have converted the table to meters or the floor plan to inches, or authored the table in a unitless manner to adapt to any system of units used in a drawing. The present invention allows the user more flexibility by allowing multiple unit systems to be used in a single drawing.

Drawing Scale Property of the Software Content Object

The drawing scale property 222 of the software content object 200 defined the drawing scale that the graphical elements 216 were designed for.

In the present invention, the drawing scale property 222 is used exclusively to detect when a software content object is being used in an unintended situation. For example, cubicle partitions and desks would typically be used in architectural drawings, which may have a drawing scale like ¼ inch=1 foot, or a drawing scale 222 of 48. If a user attempts to use a desk in a drawing of a flow chart with a drawing scale of 1 inch=1 inch, the desk would dwarf the rest of the flowchart. This scenario is possible when the flowchart represents the manufacturing steps necessary to build the desk, and the desk is being included in the flowchart to convey what the final product will look like.

When the user inserts content into the drawing program, the interpreter 224 compares the drawing scale that the user is working in, i.e., the flow chart has a drawing scale of 1:1, with the drawing scale that the content is authored in, i.e., the cubicle partitions are authored in a scale of 1:48. If the two drawing scales differ by more than some preset factor, then the content is prescaled such that when the graphics 216 and text 218 axe merged to the target document prints at the same size it would print if used in the situation that it was designed for. For example, in the flowchart example above, the partition is automatically scaled down by a factor of 48, and appears as 1 inch on the flowchart document. In particular, it would set shape property scale method 204 to override scale, and the override scale factors 206 and 212 to ⅟₄₈ during the merge. The preset factor can be changed by the user, but is typically set as a value between eight and ten.

Scale Method of the Shape Object

Many drawings are actually a mix of geometry that is drawn-to-scale and geometry that is drawn relative to the size of a page. For example, within the design of the electrical system on a floor plan, wall switches are always drawn to be ¼ inch on the printed page, independent of the drawing scale. This automatic drawing of wall switches is done for readability purposes.

The present invention allows the user, through the use of the scale method 204 property of the shape object, to have the ability to specify whether the shape object 200 unit system 202 is relative to the printed page or relative to the drawn-to-scale geometry. Thus, the light switch specifies that it be drawn in inches relative to the printed page. The interpreter 224 then interprets how the light switch software shape object 200 is being used, and presents the shape object 200 on the monitor differently depending on the usage of the object 200.

Flowchart

Figure 3:
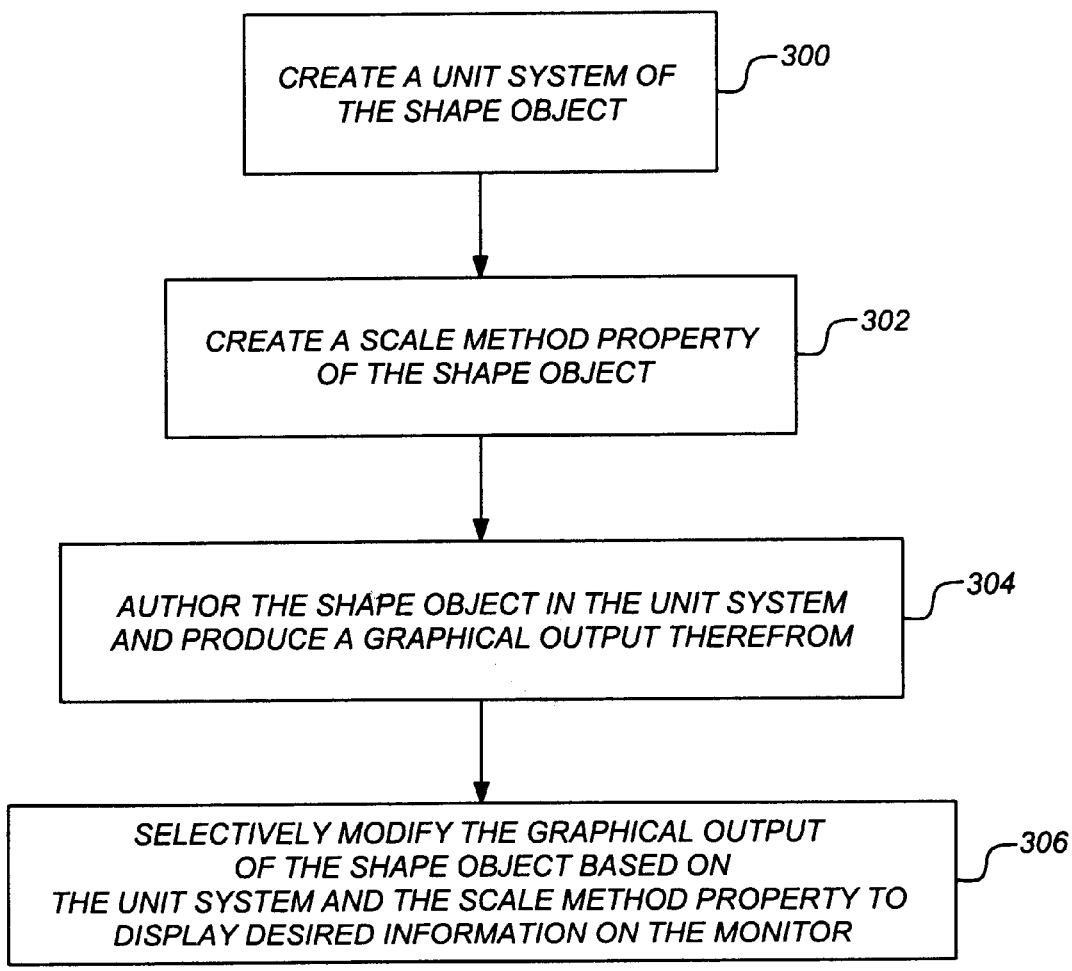
FIG. 3 is a flowchart that illustrates the general logic of performing the steps of the present invention.

FIG. 3 is a flowchart that illustrates the general logic of performing the steps of the present invention.

Block 300 represents performing the step of creating a unit system of the shape object, Block 302 represents performing the step of creating a scale method property of the shape object.

Block 304 represents performing the step of authoring the shape object in the unit system and producing a graphical output therefrom.

Block 306 represents performing the step of selectively modifying the graphical output of the shape object based on the unit system and the scale method property to display desired information on the monitor.

Conclusion

This concludes the description of the preferred embodiment of the invention. The following describes some alternative embodiments for accomplishing the present invention.

For example, any type of computer, such as a mainframe, minicomputer, workstation or personal computer, could be used with the present invention. In addition, any software program, application or operating system having a user interface could benefit from the present invention.

The above teaching also supports additional functions that may also be implemented using the shape or software content objects of the present invention. In addition, the shape or software content objects can be integrated closely with each application program by any number of different methods.

In summary, the present invention discloses a method, apparatus, and article of manufacture for creating a software content object for displaying information on a monitor attached to a computer. The method comprises the steps of creating a unit system of the shape object, creating a scale method property of the shape object, authoring the shape object in the unit system and producing a graphical output therefrom, and selectively modifying the graphical output of the shape object based on the unit system and the scale method property to display desired information on the monitor.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of creating a shape object for displaying information on a monitor attached to a computer, comprising the steps of:
   (a) creating a unit system of the shape object;
   (b) creating a first drawing scale of the shape object for displaying graphical output of the shape object;
   (b) creating a scale method property of the shape object;
   (c) authoring the shape object in the unit system; and
   (d) inserting the shape object into a drawing wherein:
      (i) the drawing comprises a drawing scale;
      (ii) the graphical output of the shape object is selectively modified based on the drawing scale, the unit system, and the scale method property to properly scale and display desired information on the monitor.

2. The method of claim 1, wherein the scale method property indicates whether the unit system of the shape object is relative to a size of a printed page.

3. The method of claim 1, wherein the scale method property indicates that the unit system of the shape object is relative to drawing scale of the drawing where the shape object is inserted.

4. The method of claim 1, wherein the drawing scale is altered based on a difference between a second drawing scale of the shape object and the drawing scale of the drawing where the shine object is being inserted.

5. The method of claim 1, wherein the scale method property indicates that the shape object is to be drawn in accordance with one or more scale override values.

6. The method of claim 5, wherein the scale override values are width and height override scale values.

7. A method of creating a software content object in a target drawing for encapsulating the storage and transfer of graphical information, comprising the steps of:
   (a) creating one or more graphical objects associated with the software content object;
   (b) creating a unit system associated with the software content object;
   (c) creating a first drawing scale property of the software content object;
   (d) authoring the associated graphics objects in the unit system associated with the software content object; and
   (e) merging the graphical objects associated with the software content object into the target drawing, wherein:
      (i) the target drawing comprises a second drawing scale property and
      (ii) a graphical output of the graphical objects is automatically modified based on the first drawing scale property, the unit system, and the second wing scale property to properly scale and display the graphical objects.

8. The method of claim 7, wherein the graphical object is a shape object.

9. The method of claim 8, wherein the first drawing scale is automatically modified by setting a scale method property of the shape object to use a horizontal scale factor and a vertical scale factor appropriate to the target drawing.

10. The method of claim 7, wherein the modification of the graphical output is based on a comparison of the first drawing scale property and the second drawing scale property.

11. A computer-implemented apparatus for displaying information, comprising:
   (a) a computer having a monitor attached thereto;
   (b) means performed by the computer for creating a unit system of the shape object;
   (c) means performed by the computer for creating a scale method property of the shape object;
   (d) means performed by the computer for authoring the shape object in the unit system; and
   (e) means performed by the computer for inserting the shape object into a drawing wherein:
      (i) the drawing comprises a drawing scale;
      (ii) the graphical output of the shape object is selectively modified based on the drawing scale, the unit system, and the scale method property to properly scale and display desired information on the monitor.

12. The apparatus of claim 11, wherein the scale method property indicates whether the unit system is relative to a size of a printed page.

13. The apparatus of claim 11, wherein the scale method property indicates that the unit system of the shape object is relative to drawing scale where the shape object is inserted.

14. The apparatus of claim 11, wherein the graphical output is altered based on a difference between a second drawing scale of the shape object and the drawing scale of the drawing where the shape object is inserted.

15. An article of manufacture comprising a computer program carrier readable by a computer and embodying one or more instructions executable by the computer to perform method steps of displaying information on a monitor attached to the computer, the method comprising the steps of:

(a) creating a unit system of the shape object;
(b) creating a first drawing scale of the shape object for displaying graphical output of the shape object;
(b) creating a scale method property of the shape object;
(d) authoring the shape object in the unit system; and
(e) inserting the shape object into a drawing wherein:
   (i) the drawing comprises a drawing scale;
   (ii) the graphical output is selectively modified based on the drawing scale, the unit system, and the scale method property to properly scale and display desired information on the monitor.

* * * * *

UNITED STATES PATENT AND TRADEMARK OFFICE
CERTIFICATE OF CORRECTION

PATENT NO. : 6,683,622 B2
DATED : January 27, 2004
INVENTOR(S) : David W. Arsenault It is certified that error appears in the above-identified patent and that said Letters Patent is hereby corrected as shown below:

<u>Column 7,</u>
Line 47, "(b)" should read -- (c) --.
Line 48, "(c)" should read -- (d) --.
Line 49, "(d)" should read -- (e) --.

<u>Column 8,</u>
Line 55, before "drawing" insert -- the --.

<u>Column 9,</u>
Line 4, "(b)" should read -- (c) --.

Signed and Sealed this

First Day of June, 2004

JON W. DUDAS
*Acting Director of the United States Patent and Trademark Office*